United States Patent [19]
Kouta

[11] Patent Number: 5,191,815
[45] Date of Patent: Mar. 9, 1993

[54] CONTROL SYSTEM FOR AUTOMOTIVE AUTOMATIC TRANSMISSION

[75] Inventor: Joji Kouta, Shizuoka, Japan

[73] Assignee: Jatco Corporation, Japan

[21] Appl. No.: 795,989

[22] Filed: Nov. 22, 1991

[30] Foreign Application Priority Data

Nov. 27, 1990 [JP] Japan .................... 2-324446

[51] Int. Cl.$^5$ .............................................. B60K 41/06
[52] U.S. Cl. .................................. 74/866; 364/424.1
[58] Field of Search ........................ 74/866; 364/424.1

[56] References Cited

U.S. PATENT DOCUMENTS

| | | | |
|---|---|---|---|
| 4,393,732 | 7/1983 | Suzuki et al. | 74/866 OR |
| 4,628,772 | 12/1986 | Nishikawa et al. | 74/866 OR |
| 4,919,012 | 4/1990 | Bolz | 74/866 OR |

FOREIGN PATENT DOCUMENTS 58-81258  5/1983 Japan .
63-251652 10/1988 Japan .

Primary Examiner—Leslie A. Braun
Assistant Examiner—Daniel Wittels
Attorney, Agent, or Firm—Ronald P. Kananen

[57] ABSTRACT

Disclosed is a control system for controlling a hydraulically operated automatic transmission. The control system comprises a plurality of solenoids. One of the solenoids is a line pressure control solenoid which, when deenergized, increases the line pressure to its highest level. When a malfunction of the line pressure control solenoid is detected, all of the solenoids are deenergized.

9 Claims, 5 Drawing Sheets

FIG.3

| | | C18 | C20 | C22 | C24 | B28 | B26 | OWC 30 | OWC 29 | GEAR RATIO | $\alpha_1 = 0.440$ $\alpha_2 = 0.493$ |
|---|---|---|---|---|---|---|---|---|---|---|---|
| D-RANGE | 1'ST SPEED | | | ○ | | | | ○ | ○ | $\dfrac{1+\alpha_2}{\alpha_2}$ | 3.027 |
| | 2'ND SPEED | | ○ | ○ | | ○ | | ○ | | $\dfrac{\alpha_1+\alpha_2+\alpha_1\cdot\alpha_2}{\alpha_2(1+\alpha_1)}$ | 1.619 |
| | 3'RD SPEED | | ○ | ○ | ○ | | | ○ | | 1 | 1.000 |
| | 4'TH SPEED | | | (○) | ○ | ○ | | | | $\dfrac{1}{1+\alpha_1}$ | 0.694 |
| ENGINE BRAKING | 1'ST SPEED | | | (○) | ○ | ○ | ○ | (○) | (○) | | |
| | 2'ND SPEED | | | (○) | ○ | ○ | | (○) | | | |
| | 3'RD SPEED | | ○ | (○) | | ○ | | (○) | | | |
| | 4'TH SPEED | | ○ | (○) | | ○ | | | | | |
| REVERSE | | ○ | | | | | ○ | | | $-\dfrac{1}{\alpha_1}$ | -2.272 |

CONTROL SYSTEM FOR AUTOMOTIVE AUTOMATIC TRANSMISSION

BACKGROUND OF THE INVENTION

1. Field of the Invention

The present invention relates to a control system for automatic transmissions, and more particularly, to a control system for automotive automatic transmissions.

2. Description of the Prior Art

Japanese Patent First Provisional Publication 58-81258 shows a control system for a V-belt type continuously variable automatic transmission installed in a motor vehicle. In this control system, a so-called "fail-safe measure" is employed in which when a torque motor for a line pressure adjusting valve becomes out of order, the torque motor is deenergized and the line pressure adjusting valve is controlled to keep the line pressure at the highest level. With this measure, the motor vehicle is permitted to run irrespective of the trouble of the torque motor.

However, hitherto, some conventional control systems including the above-mentioned control system have failed to give sufficient consideration to an undesired short-circuit which might occur between the wiring of a solenoid for line pressure control and that of the other solenoids. In fact, the wires for the line pressure controlling solenoid and those for the other solenoids are bound into a harness. The harness is connected through a connector to another harness which extends from a control unit. Thus, in automatic transmission control systems having such wiring, an undesired short-circuit tends to occur between the neighboring wires due to, for example, breakage of sheaths of the wires, immersion of water through the broken sheaths, immersion of water into the connector or the like. Of course, the short-circuit of the wiring causes a trouble or stopping of the motor vehicle.

That is, upon the short-circuit of the wiring, the operation of the line pressure control solenoid becomes inconsistent with an instruction signal from the control unit. In this case, judging that there is an abnormal condition or malfunction in the control system, the control unit issues an OFF signal to the line pressure control solenoid. However, due to the short-circuit which is kept established, ON signals normally fed from the control unit to the other solenoids (such as, a solenoid for controlling the speed gear, a solenoid for controlling the lock-up mechanism, a solenoid for controlling the engine brake and the like) cause the line pressure control solenoid to become ON thereby establishing a lower line pressure. As is known, when the motor vehicle is continued to run with such lower line pressure fed to the transmission, the clutches and brakes of the transmission easily seize because of undertorque of the clutches and brakes.

SUMMARY OF THE INVENTION

It is therefore an object of the present invention to provide a control system for an automotive automatic transmission, which is free of the above-mentioned drawbacks.

According to the present invention, there is provided a control system for a hydraulically operated automatic transmission in which, when a line pressure control solenoid is detected to have a malfunction, not only the solenoid but also the other solenoids are all deenergized.

According to the present invention, there is provided a control system for controlling a hydraulically operated automatic transmission. The control system comprises a plurality of solenoids, one of the solenoids being a line pressure control solenoid which, when deenergized, increases the line pressure to the highest level; first means for detecting a malfunction of the line pressure control solenoid; and second means for deenergizing all of the solenoids when the first means detects the malfunction of the line pressure control solenoid.

BRIEF DESCRIPTION OF THE DRAWINGS

Other objects and advantages of the present invention will become apparent from the following description when taken in conjunction with the accompanying drawings, in which:

FIG. 3 is a TABLE showing ON/OFF conditions of various friction elements of the automatic transmission with respect to speeds selected by the transmission;

DETAILED DESCRIPTION OF THE INVENTION

Figure 1:
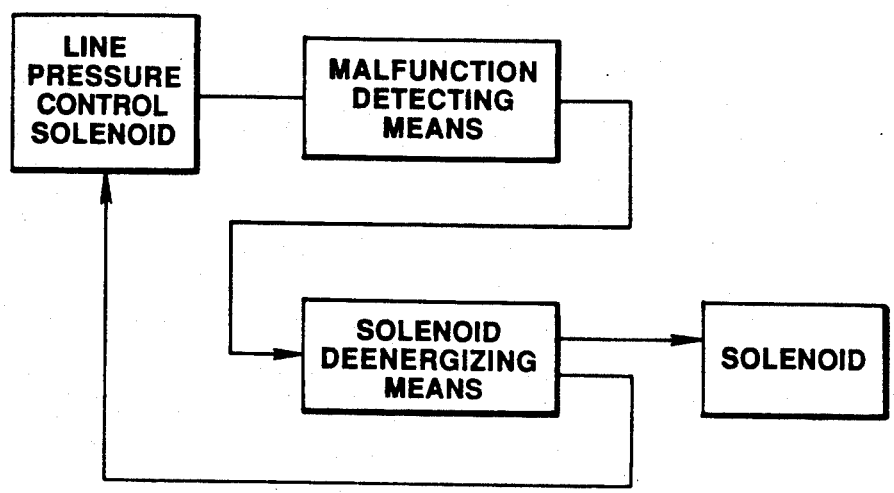
FIG. 1 is a schematic illustration showing the concept of the present invention.

Referring to the drawings, there is shown an embodiment of the present invention.

Figure 2:
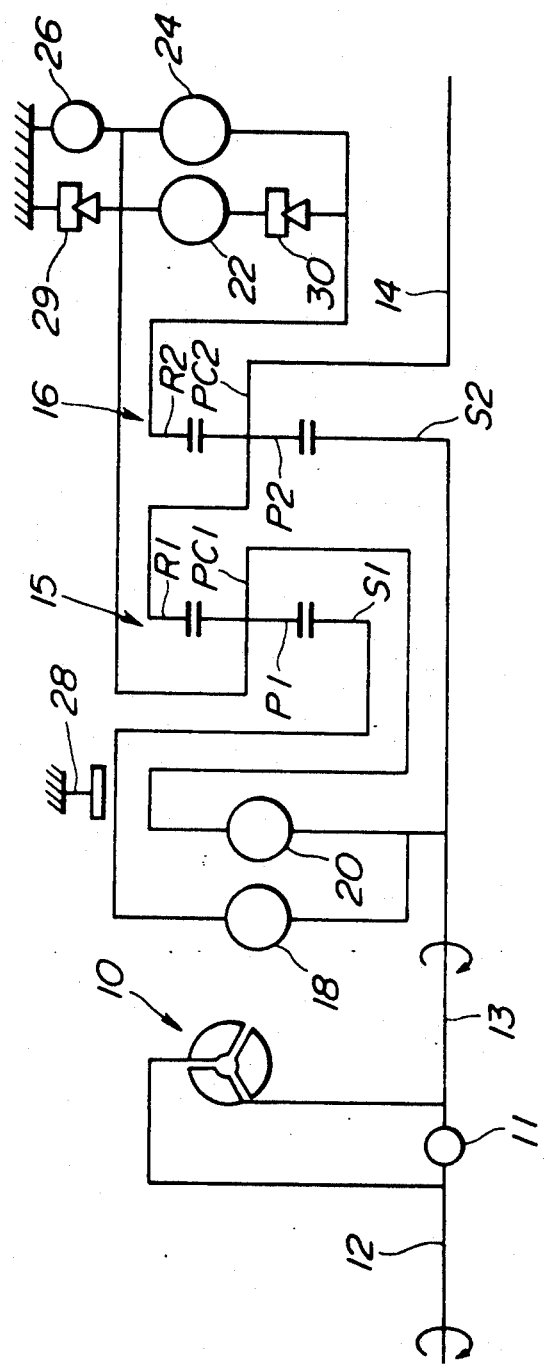
FIG. 2 is a schematic illustration of an automatic transmission to which the present invention is applied.

In FIG. 2, there is schematically shown an automotive automatic transmission of a type having an overdrive, four forward speeds and one reverse.

The transmission comprises an input shaft 13 to which a torque of an engine output shaft 12 is transmitted through a torque converter 10. Designated by numeral 14 is an output shaft of the transmission through which a driving force is fed to a final drive device (not shown). Between the input and output shafts 13 and 14, there are disposed, in the illustrated manner, a first planetary gear unit 15, a second planetary gear unit 16, a reverse clutch 18, a high clutch 20, a forward clutch 22, an overrunning clutch 24, a low-and-reverse brake 26, a band brake 28, a low-oneway clutch 29 and a forward-oneway clutch 30.

The torque converter 10 has a lock-up clutch 11 installed therein.

The first planetary gear unit 15 comprises a sun gear S1, an internal gear R1, pinion gears P1 each meshing with both the sun gear S1 and the internal gear R1, and a pinion gear carrier PC1 carrying the pinion gears P1.

The pinion gear carrier PC1 is connectable to the input shaft 13 through the high clutch 20, and the sun gear S1 is connectable to the input shaft 13 through the reverse clutch 18.

The second planetary gear unit 16 comprises a sun gear S2, an internal gear R2, pinion gears P2 each meshing with both the sun gear S2 and the internal gear R2, and a pinion gear carrier PC2 carrying the pinion gears P2.

The pinion gear carrier PC1 of the first planetary gear unit 15 is connectable to the internal gear R2 of the second planetary gear unit 16 through the forward clutch 22 and the forward-oneway clutch 30 which are connected in tandem or through the overrunning clutch 24 which is arranged in parallel with the tandem connected clutches 22 and 30.

The sun gear R2 of the second planetary gear unit 16 is constantly connected with the input shaft 13, and the internal gear R1 of the first planetary gear unit 15 and the pinion gear carrier PC2 of the second planetary gear unit 16 are constantly connected with the output shaft 14.

The low-and-reverse brake 26 can fix the pinion gear carrier PC1 of the first planetary gear unit 15 and the band brake 28 can fix the sun gear S1 of the first planetary gear unit 15.

The low-oneway clutch 29 is so arranged as to permit only a normal rotation (viz., the rotation in the same direction as the engine output shaft 12) of the pinion gear carrier PC1 of the first planetary gear unit 15. That is, a reversed rotation of the pinion gear carrier PC1 is suppressed by the clutch 29.

By selectively engaging and disengaging the clutches 18, 20, 22, 24, 29 and 30 and the brakes 26 and 28 in various combinations, the elements (viz., S1, S2, R1, R2, PC1 and PC2) of the first and second planetary gear units 15 and 16 are forced to change their operating conditions. With this changing, the ratio of rotation speed of the output shaft 14 relative to that of the input shaft 13 can be variously changed.

FIG. 3 is a table showing the various gear speeds (viz., first, second, third and fourth forward speeds and a reverse) which are given by the ON/OFF conditions of the clutches 18, 20, 22, 24, 29 and 30 and the brakes 26 and 28.

In the table, the mark "O" means "ON" or engaged condition of the associated clutch or brake and "blank" means an "OFF" or a disengaged condition of the same. The mark "(O)" means an engaged condition of an associated clutch or brake. However, this engaged condition does not participate in power transmission in the established gear speed. It is to be noted that "α1" or "α2" is a ratio of the number of teeth of the sun gear S1 or S2 relative to that of the internal gear R1 or R2, and the "GEAR RATIO" is the ratio of the rotation speed of the input shaft 13 relative to that of the output shaft 14.

Figure 4:
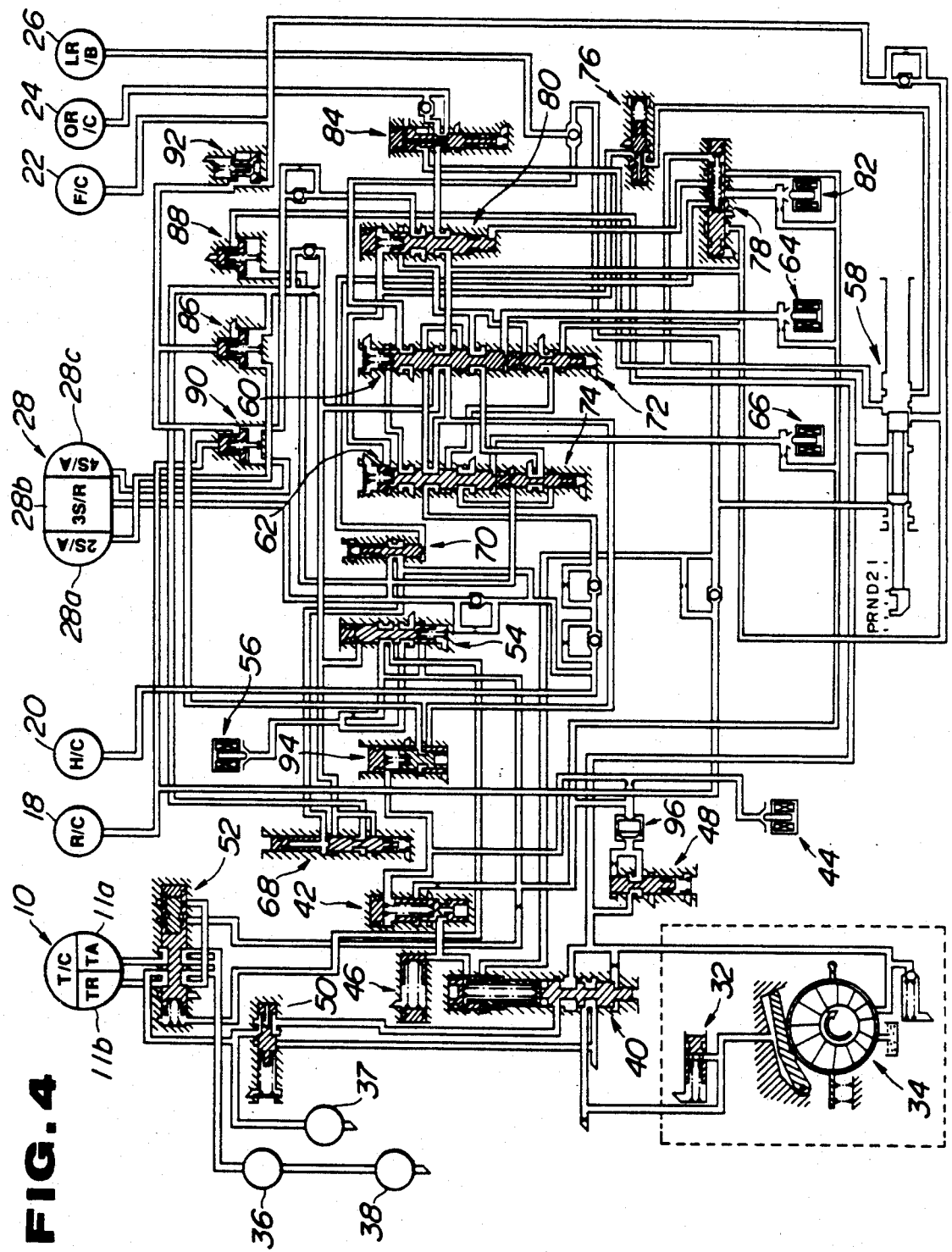
FIG. 4 is a view of a hydraulic circuit of the transmission.

FIG. 4 shows a hydraulic control circuit for controlling operation of the above-mentioned automatic transmission. The control circuit comprises a line pressure control valve 40, a pressure modifier valve 42, a line pressure control solenoid 44, a modified pressure accumulator 46, a pilot valve 48, a torque converter relief valve 50, a lock-up control valve 52, a first shuttle valve 54, a lock-up control solenoid 56, a manual valve 58, a first shift valve 60, a second shift valve 62, a first shift solenoid 64, a second shift solenoid 66, a servo-charger valve 68, a 3-2 timing valve 70, a 4-2 relay valve 72, a 4-2 sequence valve 74, a first reducing valve 76, a second shuttle valve 78, an overrunning clutch control valve 80, an overrunning clutch solenoid (viz., engine brake controlling solenoid) 82, an overrunning clutch reducing valve 84, a 1-2 accumulator 86, a 2-3 accumulator 88, a 3-4 accumulator 90, a N-D accumulator 92, an accumulator control valve 94 and a filter 96. These elements are connected in such a manner as is shown in the drawing.

The torque converter 10 has therein pressure apply and release chambers 11a and 11b for the lock-up clutch 11. This torque converter 10, the forward clutch 22, the high clutch 20, the band brake 28, the reverse clutch 18, the low-and-reverse brake 26 and the overrunning clutch 24 are connected to the hydraulic control circuit in the illustrated manner. The band brake 28 has a pressure apply chamber 28a for the second speed, a pressure release chamber 28b for the third speed and a pressure apply chamber 28c for the fourth speed incorporated therewith.

An oil pump 34 of capacity variable vane type, an oil cooler 36, a front lubrication circuit 37 and a rear lubrication circuit 38 are connected in the illustrated manner. The oil pump 34 is equipped with a feedback accumulator 32.

The hydraulic control circuit of this type is described in detail in Japanese Patent First Provisional Publication No. 63-251652.

Figure 5:
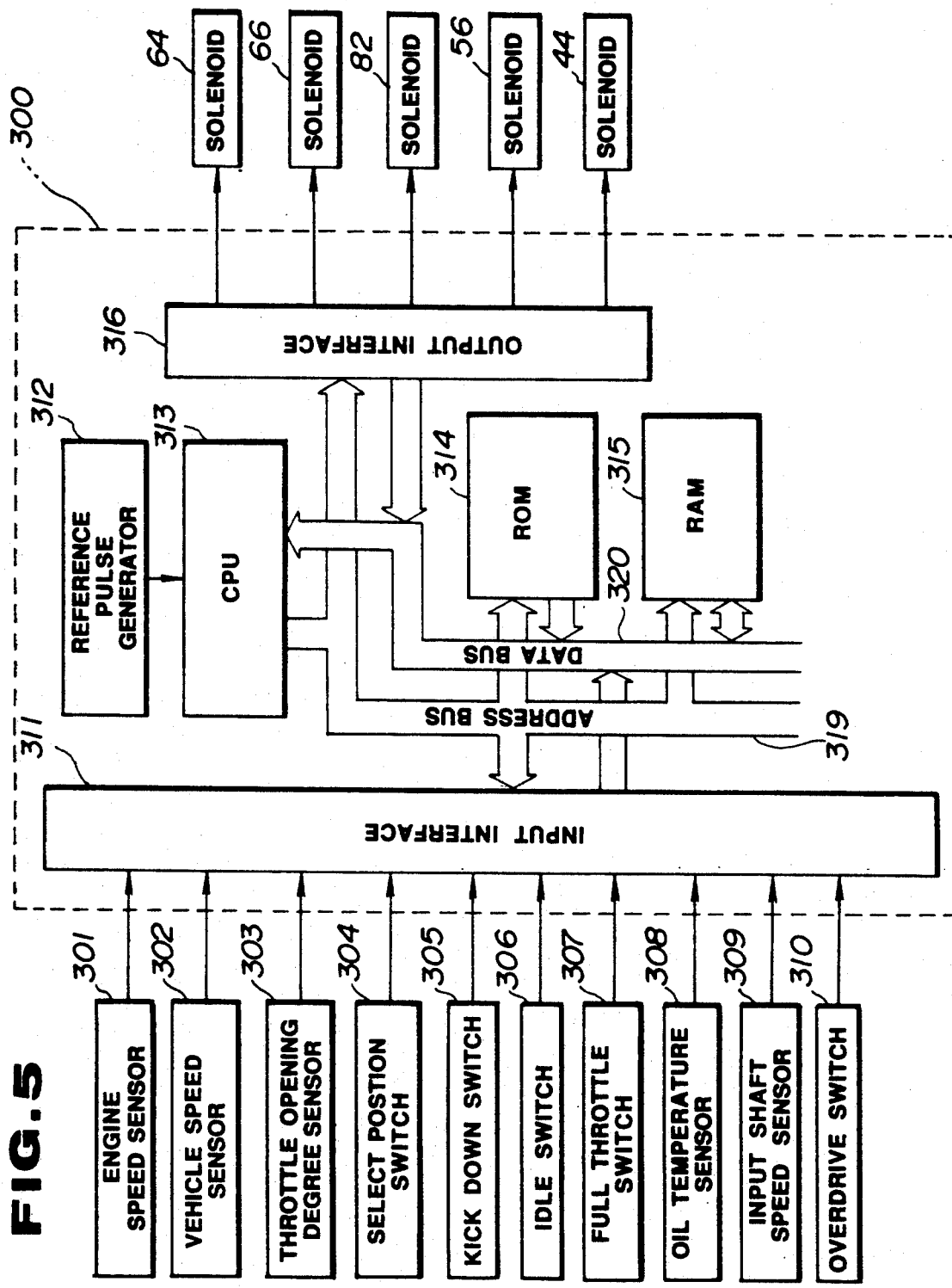
FIG. 5 is a schematic view of a control unit for controlling the transmission.

FIG. 5 shows schematically a control unit 300 which controls the operation of the solenoids 44, 56, 64, 66 and 82. As shown, the control unit 300 comprises an input interface 311, a reference pulse generator 312, a central processing unit (CPU) 313, a read only memory (ROM) 314, a random access memory (RAM) 315 and an output interface 316, an address bus 319 and a data bus 320.

Information signals from an engine speed sensor 301, a vehicle speed sensor 302, a throttle opening degree sensor 303, a select position switch 304, a kick down switch 305, an idle switch 306, a full throttle switch 307, an oil temperature switch 308, an input shaft speed sensor 309 and an over-drive switch 310 are fed to the input interface 311 of the control unit 300.

Instruction signals from the output interface 316 of the control unit 300 are fed to the first shift solenoid 64, the second shift solenoid 66, the overrunning clutch solenoid 82, the lock-up control solenoid 56 and the line pressure control solenoid 44.

Figure 6:
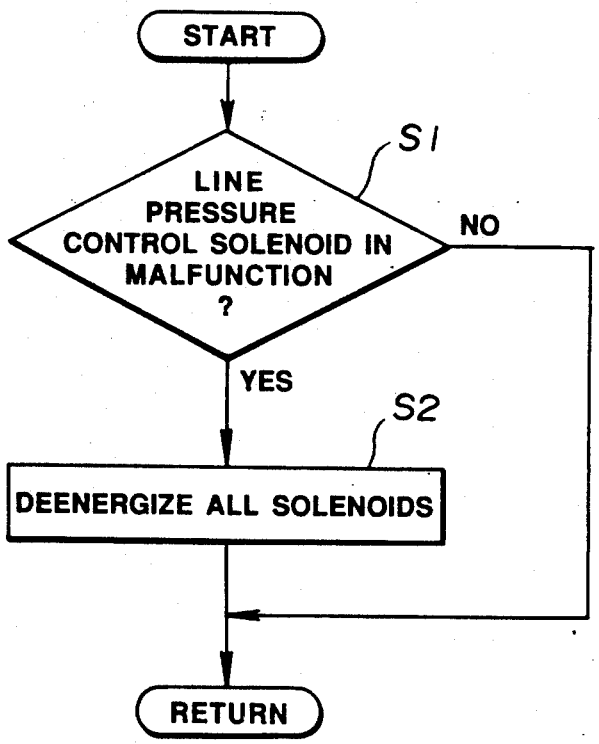
FIG. 6 is a flowchart showing operation steps carried out in a computer of the control unit.

Malfunction judgement against the line pressure control solenoid 44 and control for the other solenoids 56, 64, 66 and 82 are carried out in a manner as is shown in the flowchart of FIG. 6. That is, at step 1 (S1), a judgement is made as to whether the line pressure control solenoid 44 is normally operated or not. This judgement is carried out by comparing the voltage practically applied to the line pressure control solenoid with an instruction signal fed to the solenoid 44 from the control unit 300. When the voltage is in agreement with the instruction signal, it is judged that the line pressure control solenoid 44 is operated normally. While, when, due to for example a short-circuit between the wiring of the line pressure control solenoid 44 and that of the other solenoids, the voltage applied to the solenoid 44 is not in agreement with the instruction signal, it is judged that the solenoid 44 is not operated normally.

When the solenoid 44 is judged to undergo a malfunction (viz., if Yes at step S1), the operation flow goes to step S2 to issue signals to deenergize all of the solenoids 44, 56, 64, 66 and 82.

When the line pressure control solenoid 44 is deenergized, its plunger (see FIG. 4) closes its drain port. With this, the pressure modified by the pressure modifier valve 42 is forced to keep its highest level, and thus, the line pressure controlled by the line pressure control valve 40 is forced to keep its highest level.

When the lock-up control solenoid 56 is deenergized, its plunger closes its drain port. With this, the lock-up control valve 52 is actuated in a manner to cancel the lock-up condition of the lock-up clutch 11.

When the overrunning clutch solenoid 82 is deenergized, its plunger opens its drain port. With this, the overrunning clutch control valve 80 is actuated to engage the overrunning clutch 24. Thus, engine brake is available.

When the first and second shift solenoids 64 and 66 are deenergized, their plungers open their drain ports. With this, the first and second shift valves 60 and 62 are actuated to assume third speed conditions respectively. Thus, the third speed is fixed in the transmission.

That is, when all the solenoids 44, 56, 64, 66 and 82 are deenergized upon malfunction of the line pressure control solenoid 44, the line pressure is increased to its highest level, the gear speed of the transmission is fixed at the third speed, the lock-up clutch 11 is released and the engine brake is available. This means that even defectively, the associated motor vehicle can continue to run to a neighboring auto repair shop. During this running, the clutches and the brakes of the transmission are prevented from seizure because of sufficiently enough torque provided to them by the high line pressure.

Although the above description is directed to a control system for a multistage automatic transmission, the present invention is also applicable to a control system for a continuously variable automatic transmission, such as a V-belt type transmission, a toroidal disc type transmission or the like.

What is claimed is:

1. A control system for controlling a hydraulically operated automatic transmission, comprising:
    a plurality of solenoids, one of said solenoids being a line pressure control solenoid having at least one electrical input signal thereto, said line pressure solenoid, when electrically deenergized, increases the line pressure to its highest level;
    first means for detecting a malfunction of said line pressure control solenoid by sensing input signals errors to said first means; and
    second means for electrically deenergizing all of said solenoids when said first means detects the malfunction of said line pressure control solenoid whereby the line pressure is increased to it's highest level for permitting said transmission to operate at a high speed ratio.

2. A control system as claimed in claim 1, in which at least one of the solenoids other than said line pressure control solenoid is a speed change solenoid which is constructed to effect in the transmission a gear speed higher than a second gear speed when electrically deenergized.

3. A control system as claimed in claim 1, in which at least two of the solenoids other than said line pressure control solenoid are speed change solenoids which, when electrically deenergized, effect in the transmission a gear speed higher than a second gear speed.

4. A control system as claimed in claim 2, in which one of the solenoids other than said line pressure control solenoid and said speed change solenoid is a lock-up control solenoid which, when electrically deenergized, cancels a lock-up condition of a lock-up mechanism which is incorporated with a torque converter of the transmission.

5. A control system as claimed in claim 4, in which one of the solenoids other than said line pressure control solenoid, said speed change solenoid and said lock-up control solenoid is an engine brake control solenoid which, when electrically deenergized, permits a practical use of engine braking.

6. A control system as claimed in claim 1, in which said first means compares, for detecting said malfunction, a voltage practically applied to said line pressure control solenoid with an instruction signal fed thereto from a computer.

7. A control system as claimed in claim 6, in which said second means is installed in said computer.

8. A control system as claimed in claim 1, in which one of the solenoids other than said line pressure control solenoid is a lock-up control solenoid which, when electrically deenergized, cancels a lock-up condition of a lock-up mechanism which is incorporated with a torque converter of the transmission.

9. A control system as claimed in claim 1, in which one of the solenoids other than said line pressure control solenoid is an engine brake control solenoid which, when electrically deenergized, permits a practical use of engine braking.

* * * * *